Patented Mar. 19, 1946

2,396,710

UNITED STATES PATENT OFFICE 2,396,710

PRODUCTION OF SMOKE SCREENS

Harold A. Levey and Alonzo C. Patterson, New Orleans, La.; said Levey assignor to said Patterson No Drawing. Application July 8, 1942, Serial No. 450,202

8 Claims. (Cl. 252—305)

The present invention is directed to smoke screen compositions, and to smoke screens produced therefrom, the latter being suitable for military, maritime and peaceful purposes, including the obscuring of land operations and maritime movements. The invention is also directed to a method of preparing the smoke screens.

The composition of the present invention contains a smoke producing ingredient such as a mineral oil hydrocarbon typified by a lubricating oil in which there is preferably dissolved or partially dissolved an oil soluble dyestuff. It is essential that the dyestuff be of such a nature that it does not break down or disintegrate at the temperature present in the exhaust conduit of an internal combustion engine, or at an equivalent temperature produced by any other means. Further, the dyestuff must be capable of volatilization at said temperature or in the neighborhood of said temperature, or be able to distill at said temperature in an unchanged form as to coloring ability.

The mineral oil base or equivalent base when subjected to a temperature ranging from 250° F. to 750° F., but preferably from 250 to 425° F., vaporizes and furnishes a smoke screen or cloud in which the smoke screen base, be it a mineral oil or other equivalent, is unburned and exhausts in the form of a vapor or atomized state dispersed and suspended in the atmosphere.

While it has been stated that it is preferable that the dyestuffs dissolve in or partially dissolve in the smoke screen base, as for example a mineral oil, said smoke screen base being adapted to produce a fog or cloud or mist, this is not absolutely necessary. It will be sufficient if the dyestuffs are capable of distilling or vaporizing at the temperature present in the exhaust conduit or manifold of an internal combustion engine, or at an equivalent temperature produced by any other means in order to properly color the smoke screen fog or cloud. When it is desired to color the smoke screen with a primary color, that is a color selected from the group consisting of red, yellow, and blue, only a single dyestuff need be incorporated in the smoke screen base. When it is desired to color the fog or mist produced from the smoke screen base a color other than a primary color, then this may be accomplished by incorporating in the smoke screen base a blend of dyestuffs adapted to produce secondary and tertiary colors. For example, secondary colors such as orange, green and purple may be produced from the proper combination of two colors selected from the primary group of red, yellow and blue.

While the present invention is disclosed primarily in connection with a mineral oil base, it is recognized that oily substances such as animal and vegetable fats and oils, petroleum, waxes, organic solvents, crystalline and colloidal masses which are capable of being liquefied at the temperatures which exist in the exhaust manifold of automotive engines, are equally suitable in carrying out the invention. In fact, any type of smoke screen base may be used which will form a liquid at the temperature prevailing in the exhaust manifold of automobile engines, and which will form globules at said temperature, as previously described, and develop a more or less opaque fog, depending upon the mechanics of atomization. Any smoke screen base may be used which is reasonably fluid at ordinary temperatures, is capable of being atomized or sprayed into liquid globules which may be suspended in a gas or in the atmosphere, and which will be further divided into very much smaller liquid globules without destruction at a temperature varying between 250° F. to 700° F., but preferably around 400° F. or, stated differently, at the temperature of the gases present in the exhaust pipe of an automotive gasoline engine. These conditions substantially define the low vapor pressure required of the liquid, and its capability of forming a mist, fume, or artificial fog. In short, it is only necessary that the smoke screen base be a substance that has a low vapor pressure, said substance being either a liquid or being capable of atomization by both mechanical spraying devices, as well as by heat, without being destroyed or modified by the temperatures and the atmosphere of the exhaust gases present in an automotive gasoline engine, or in a Diesel engine. More specifically, clouds of this type may be produced made up of asphaltum, coal tar pitch, various types of residua from petroleum distillates, tarry residues from the distillation of wood, and similar vegetable products, as well as derivatives obtained in the process of both high and low temperature distillation of coals, lignites, peat, and the various recognized chemical solvents such as chlorinated hydrocarbons, nitrohydrocarbons, amino derivatives of the hydrocarbons, ketones, aldehydes, acids, and esters. Examples of organic esters are dibutylphthalate, tricresyl phosphate, and the like. Of course, the smoke screen bases must not be subject to combustion under the conditions which prevail in the exhaust pipes of internal combustion engines.

While the mineral oil base used in carrying out the present invention may include any of the well known types of lubricating oil, it is preferred to use a Gulf coastal oil which has as its prevailing components a naphthenic base. In the examples herein set forth, the oil phase preferably comprises a petroleum fraction with a flash point above 400° F., and an initial viscosity of 10 seconds S. A. E. at 210° F., said oil being preferably a Gulf coastal oil of the character set forth. However, other types of petroleum oils may be used such as the Mid-Continental variety which contains mixed asphaltic and paraffinic bases; the Pennsylvania type of oil having a paraffinic base, and the California type of oil which has an asphalt base. The cyclic oils of Russian origin may also be used equally as well as the Gulf coastal oils referred to.

In the more specific aspect of the present invention, it has been ascertained that the dyestuff known as Red Para Toner Dark gives excellent results as a coloring medium for the smoke screen mist or fog, said dyestuff being a reaction product of paranitraniline and betanaphthol. When the dyestuff which is partially soluble in the lubricating oil is incorporated in the oil and the oil is converted into a mist or vapor in a smoke screen generator such as set forth in application Serial No. 441,724, filed May 4, 1942, the dyestuff vaporizes, forming a more or less red gas which in turn colors the white opaque vapors of the lubricating oil. It may be pointed out that all dyestuffs do not function in this manner. Many of the oil soluble dyestuffs do not color the vapors or globules forming the smoke screen mist. The following is a specific example illustrating the use of Red Para Toner Dark dyestuff:

Example I

| | | |
|---|---|---|
| Lubricating oil | gallon | 1 |
| Ammonium chloride | pound | 1 |
| Sodium stearate | do | 0.10 |
| Para Toner Dark | do | 2 |

Sudan Yellow GGA, as made by General Dyestuffs Corp., which forms an excellent yellow vapor, and Celliton Fast Violet BA, as made by General Dyestuffs Corp., which forms a good purple vapor, while Celanthrene Red 3B Conc. 125% developed a magenta vapor. This last dyestuff is made by E. I. du Pont de Nemours.

Example II

| | | |
|---|---|---|
| Brown dyestuff | pounds | 1.5 |
| Lubricating oil | gallon | 1 |
| Ammonium chloride | pounds | 0.8 |
| Aluminum stearate | do | 0.09 |

The brown dyestuff used in the above example was Oil Brown AP, manufactured by Calco Chemical Co., of Bound Brook, New Jersey.

Example III

| | | |
|---|---|---|
| Calco Oil Yellow 2G Conc | pounds | 1.3 |
| Lubricating oil | gallon | 1 |
| Ammonium chloride | pound | 0.7 |
| Calcium stearate | do | 0.08 |

The above yellow dyestuff is also manufactured by Calco Chemical Co.

Example IV

| | | |
|---|---|---|
| Calco Oil Red N-1700 | pounds | 1.6 |
| Lubricating oil | gallon | 1 |
| Ammonium chloride | pound | 0.8 |
| Zinc resinate | do | 0.07 |

Example V

| | | |
|---|---|---|
| Calco Oil Blue NA | pounds | 1.4 |
| Lubricating oil | gallon | 1 |
| Ammonium chloride | pound | 0.8 |
| Magnesium montanate | do | 0.10 |

Example VI

To form a secondary color such as green, 60 parts by weight of the composition of Example V were mixed with 40 parts by weight of Example III. This mixture of a blue composition and a yellow composition produced a green smoke.

Example VII

A gray smoke was produced by mixing 65 parts of Example V composition with 20 parts of Example III composition and 15 parts of Example IV composition, all of these being parts by weight.

Example VIII

A purple smoke composition was formed by mixing 60 parts of Example V composition with 40 parts of Example IV composition. It is to be noted, however, that there are a number of purple dyes which may be used to produce this color directly.

Example IX

To produce an orange smoke cloud, equal parts of Example IV composition were mixed with a composition of Example III.

Obviously, almost any desired color can be produced in accordance with the above examples by varying the quantities of the various basic color compositions.

In all of the above examples, the lubricating oil comprises a petroleum fraction with a flash point above 400° C., and an initial viscosity of 10 seconds S. A. E. at 210° F.

It is to be noted that all of the above compositions include ammonium chloride which functions as a density imparting agent, as well as various metallic soaps such as sodium, aluminum, or calcium stearate, zinc resinate, or magnesium montanate. The ammonium chloride functions as a density imparting agent so as to increase the density and opacity of the smoke screen. The metallic soaps are viscosity inducing agents for maintaining the suspension of the ammonium chloride crystals throughout the mass uniformly. In this connection, it may be added that the metallic soaps also function to some extent in maintaining in suspension dyestuffs which possess a limited solubility in the oil or are actually insoluble therein. The exact function of the viscosity and density imparting agents is set forth in more detail in copending application Serial No. 441,550, filed May 2, 1942. It is to be understood that almost any of the viscosity inducing agents and density imparting agents disclosed in said prior application may be successfully used in connection with the color ingredients herein set forth.

The amounts of ammonium chloride used may be varied and, in general, from .25 pound to 2.5 pounds of ammonium chloride in each gallon may be used. Preferably, however, the amount of ammonium chloride used is approximately 1 pound per gallon. The amount of metallic soap used may range from as low as .3% to as high as 3% of the weight of the oil. It is not essential in accordance with the present invention to incorporate viscosity inducing agents or density imparting agents in the composition. Good results have been obtained in the formation of a color screen by merely dissolving or suspending a suitable dye-stuff in a volatile solvent or suspending medium, as for example, benzol, alcohol, water, petroleum ether, petroleum naphtha, or coal tar naphtha. Further, any other substance with a relatively low boiling point capable of gassification in the exhaust system of an automotive engine may be used.

It is desired to point out that the dye-stuff need not be soluble in the particular solvent or suspending medium. However, it is essential that the dyestuff is capable of vaporization without destruction or undergoing a substantial chemical change, degradation, or molecular rearrangement which would interfere with its color characteristics. It is believed that the dyestuff in most instances does not dye or tint the oil vapor, but colors the resulting composite cloud, mist, vapor or fog, due to the existence of the dyestuff as separate isolated particles which condense as dispersed solids or sublime at atmospheric temperatures on being discharged from the tail pipe of the exhaust system. This probably accounts for the ability of insoluble dyestuffs which do not color the oil at room temperatures to produce a cloud of marked color value after passing through a smoke generator of the character previously described. In some instances, the color of the cloud may be of a different shade or even of a different color than the dyestuff itself at room temperatures. Thus, a dyestuff which exhibits a black appearance to the eye when in powdered form may form a blue cloud, and upon heating to 150 degrees higher temperature, may actually form a magenta to crimson cloud.

The compositions herein disclosed may be converted into a smoke screen by injecting the composition into the exhaust manifold of an internal combustion engine where the temperature will vary from 250 to 500° F. However, the smoke screen composition of the present invention may, under some circumstances, be injected into the exhaust manifold of a Diesel engine where the temperature will be considerably higher, as, for example, in the neighborhood of 500 to 750° C. When the higher temperature is used, dyestuffs must be selected which will be stable at said higher temperatures and which will distill at said temperatures and impart the desired color to the resulting smoke screen mist or fog.

What is claimed is:

1. A smoke screen composition having a relatively long shelf life comprising a mineral oil in which an inhibitor of combustion is absent, an oil soluble dyestuff, the limiting amount thereof present in the mineral oil being about two pounds per gallon, dry particles of ammonium chloride which volatilize on heating of the composition and impart increased density to the resulting smoke screen, said ammonium chloride being present in an amount varying from about .25 of a pound to about 2.5 pounds per gallon of said mineral oil, and about .3 to 3% of a water soluble metallic soap adapted to maintain said particles of ammonium chloride in suspension in the mineral oil.

2. A smoke screen composition having a relatively long shelf life comprising a mineral oil in which an inhibitor of combustion is absent, an oil soluble dyestuff, the limiting amount thereof present in the mineral oil being about two pounds per gallon, dry particles of ammonium chloride which volatilize on heating of the composition and impart increased density to the resulting smoke screen produced from the composition, said ammonium chloride being present in an amount varying from about .25 of a pound to about 2.5 pounds per gallon of said mineral oil, and about .3 to 3% of a metallic soap adapted to maintain said particles of ammonium chloride in suspension in the mineral oil.

3. A smoke screen composition having a long shelf life comprising a mineral oil in which an inhibitor of combustion is absent, an oil soluble dyestuff, the limiting amount thereof present in the mineral oil being about two pounds per gallon, dry particles of ammonium chloride which volatilize on heating of the composition and impart increased density to the resulting smoke screen, the ammonium chloride particles being present in an amount varying between about .25 of a pound to about 2.5 pounds per gallon of said mineral oil, and .3 to 3% of a metallic soap adapted to maintain said particles of inorganic chloride in suspension in the mineral oil.

4. A smoke screen composition having a relatively long shelf life comprising a mineral oil in which an inhibitor of combustion is absent, a dyestuff, the limiting amount thereof in the mineral oil being about two pounds per gallon, particles of ammonium chloride which volatilize on heating of the composition and impart an increased density to the resulting smoke screen, said ammonium chloride being present in about .25 of a pound to about 2.5 pounds per gallon of said mineral oil, and a small amount of sodium stearate adapted to maintain said particles of ammonium chloride suspended in said mineral oil.

5. The method of producing a colored smoke screen comprising incorporating an oil soluble dyestuff in a smoke screen base containing a liquid hydrocarbon in which inhibitors of combustion are absent, said hydrocarbon on heating vaporizing and on condensing forming a cloud, dry particles of ammonium chloride which volatilize on heating of the composition and impart increased opacity and density to the resulting smoke screen cloud, said dry particles of ammonium chloride being present in the smoke screen base in an amount varying from about .25 of a pound to about 2.5 per gallon of liquid hydrocarbon, the latter being present in the smoke screen base in a predominating proportion, the limiting amount of the dyestuff which may be incorporated in the liquid hydrocarbon being two pounds per gallon thereof, and .3% to 3% of a metallic soap, taken on the weight of the hydrocarbon smoke screen base, to maintain said particles of opacity and density increasing material in suspension in said hydrocarbon smoke screen base.

6. The method of producing a colored smoke screen comprising incorporating an oil soluble dyestuff in a lubricating oil in which inhibitors of combustion are absent, said lubricating oil on being heated at a temperature varying from 250° to 750° F. vaporizing, and on condensing forming a cloud, and dry particles of an inorganic chloride which volatilize on heating of the composition at said temperature and impart increased opacity and density to the resulting smoke screen, said inorganic chloride being present in said oil in an amount varying from about .25 of a pound to about 2.5 pounds per gallon of lubricating oil, the latter being present in the mixture in a predominating proportion, the limiting amount of dyestuff which may be incorporated in the oil being two pounds per gallon, and heating the resulting mass at a temperature varying from 250° to 750° F. to vaporize said lubricating oil and said inorganic chloride and distill said dyestuff, said heated mass on contact with the atmosphere producing a smoke screen cloud colored by said distilled dyestuff.

7. The method of producing a colored smoke screen comprising incorporating the reaction product of para-nitraniline and beta-naphthol in a smoke screen base containing a mineral oil in which inhibitors of combustion are absent, the mineral oil on heating vaporizing and on condensing forming a cloud, dry particles of ammonium chloride which volatilize on heating of the composition and impart increased opacity and density to the resulting smoke screen cloud, said dry particles of ammonium chloride being present in the smoke screen base in an amount varying from about .25 of a pound to about 2.5 pounds per gallon of mineral oil, the latter being present in the mixture in a predominating proportion, the limiting amount of the dyestuff which may be incorporated in the mineral oil being about two pounds per gallon thereof and .3% to 3% of a metallic soap, taken on the weight of the mineral oil smoke screen base, and heating the resulting mass at a temperature which will vaporize said smoke screen base and form a smoke screen mist, and distill said reaction product of para-nitraniline and beta-naphthol, whereupon in its vapor form it imparts its color to the smoke screen cloud.

8. The method of producing a colored smoke screen comprising incorporating a dyestuff in a smoke screen base containing a mineral oil in which inhibitors of combustion are absent, said mineral oil on heating vaporizing and on condensing forming a cloud, dry particles of ammonium chloride which volatilize on heating of the composition and impart increased opacity and density to the resulting smoke screen cloud, said dry particles of material being present in an amount varying from about .25 of a pound to about 2.5 pounds per gallon of said mineral oil, the latter being present in the smoke screen base in a predominating proportion, the limiting amount of dyestuff which may be incorporated in the mineral oil being two pounds per gallon thereof and .3% to 3% of a metallic soap, taken on the weight of the mineral oil smoke screen base, and injecting the resulting mixture in the exhaust conduit of an internal combustion engine maintained at a temperature varying between 250° and 750° F., whereupon said smoke screen base is vaporized and the dyestuff is distilled and in its vapor form imparts its color to the smoke screen cloud upon the casting of the latter into the atmosphere.

HAROLD A. LEVEY.
ALONZO C. PATTERSON.